(12) United States Patent
Churchill et al.

(10) Patent No.: US 10,185,972 B2
(45) Date of Patent: Jan. 22, 2019

(54) PREDICTING PURCHASE SESSION BEHAVIOR USING THE SHOPPING FUNNEL MODEL STAGES

(71) Applicant: eBay Inc., San Jose, CA (US)

(72) Inventors: Elizabeth Churchill, San Francisco, CA (US); Atish Das Sarma, Mountain View, CA (US); Shuo Chang, San Francisco, CA (US)

(73) Assignee: eBay Inc., San Jose, CA (US)

( * ) Notice: Subject to any disclaimer, the term of this patent is extended or adjusted under 35 U.S.C. 154(b) by 471 days.

(21) Appl. No.: 14/290,637

(22) Filed: May 29, 2014

(65) Prior Publication Data

US 2015/0348099 A1 Dec. 3, 2015

(51) Int. Cl.
*G06Q 30/00* (2012.01)
*G06Q 30/02* (2012.01)

(52) U.S. Cl.
CPC .............. *G06Q 30/0253* (2013.01)

(58) Field of Classification Search
CPC .......... G06Q 30/0253; G06Q 30/0251; G06Q 30/0254
USPC .......... 705/14.49, 14.51, 14.52, 14.54, 14.66
See application file for complete search history.

(56) References Cited

U.S. PATENT DOCUMENTS

| | | | |
|---|---|---|---|
| 6,853,982 B2 | 2/2005 | Smith et al. | |
| 8,271,357 B2 * | 9/2012 | Mohan ................. | G06Q 30/02 705/14.49 |
| 8,473,369 B2 | 6/2013 | Bradley et al. | |
| 2005/0273376 A1 | 12/2005 | Ouimet et al. | |
| 2009/0138328 A1 | 5/2009 | Higgins et al. | |
| 2010/0114654 A1 * | 5/2010 | Lukose ................. | G06Q 30/00 705/14.54 |
| 2011/0231254 A1 * | 9/2011 | Lee ....................... | G06Q 30/02 705/14.49 |
| 2011/0246406 A1 * | 10/2011 | Lahav ................... | G06Q 30/02 706/46 |
| 2011/0258053 A1 * | 10/2011 | Lee ....................... | G06Q 30/02 705/14.69 |
| 2011/0282964 A1 * | 11/2011 | Krishnaswamy ...... | G06Q 30/02 709/217 |
| 2012/0136714 A1 | 5/2012 | Nesamoney et al. | |

(Continued)

OTHER PUBLICATIONS

Bertrand Clarke, Ernest Fokoue, Hao Helen Zhang, Principles of Theory for Data Mining and Machine Learning at 251-53 (Springer New York, 2009).*

(Continued)

*Primary Examiner* — Luis A Brown
(74) *Attorney, Agent, or Firm* — Wolfe-SBMC

(57) ABSTRACT

A user activity detection engine monitors user activity during user sessions on a publication system, and detects a change in the level of the activity of the user that predicts that the user is about to execute a transaction. The change may be an increase in the level of activity. When the user activity detection engine detects such a change, the system may make an intervention to provide personalized marketing content for display to the user in an effort to improve the probability that the user will execute a transaction, and/or also to motive the user to execute the transaction on the system site instead of moving to a competitor site in search of a different transaction.

14 Claims, 11 Drawing Sheets

(56) References Cited

U.S. PATENT DOCUMENTS

2012/0221411 A1    8/2012   Graham, Jr.
2013/0226856 A1    8/2013   Zhang

OTHER PUBLICATIONS

Bettman, J., et al., "Constructive consumer choice processes", Journal of Consumer Research, 25(3), (Dec. 1998), 187-217.

Jansen, B., et al., "Bidding on the buying funnel for sponsored search and keyword advertising", Journal of Electronic Commerce Research, 12(1), (2011), 1-18.

Mild, Anreas, et al., "An Improved Collaborative Filtering Approach for Predicting Cross-Category Purchases on Binary Market Basket Data", Journal of Retailing and Consumer Services, (Oct. 2002), 123-133.

Pauwels, Koen, "Is the Classic Funnel Dead? Sales Impact of Classic and New Online Funnels", [Online]. Retrieved from the Internet: <URL: http://www.mproductivity.com/uploads/9/2/0/8/9208897/pauwels_2012.05.03_isclassicfunneldead.pdf>, (May 3, 2012), 47 pgs.

Wang, Hongning, et al., "Learning to Extract Cross-Session Search Tasks", WWW 2013,May 13-17, 2013,Rio de Janeiro,Brazil., [Online]. Retrieved from the Internet: <URL: http://research.microsoft.com/pubs/183842/WWW13_camera_fp067-wang.pdf>, (Accessed Feb. 24, 2014), 11 pgs.

\* cited by examiner

PREDICTING PURCHASE SESSION BEHAVIOR USING THE SHOPPING FUNNEL MODEL STAGES

FIELD

The present disclosure relates generally to online shopping and, in a specific example embodiment, predicting purchaser behavior in electronic transactions.

BACKGROUND

The notion of a shopping funnel explaining the narrowing of a consumer's consideration set through the purchase decision process has been widely studied. Insight into user behavior may be predicted through use of shopping funnel analysis

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
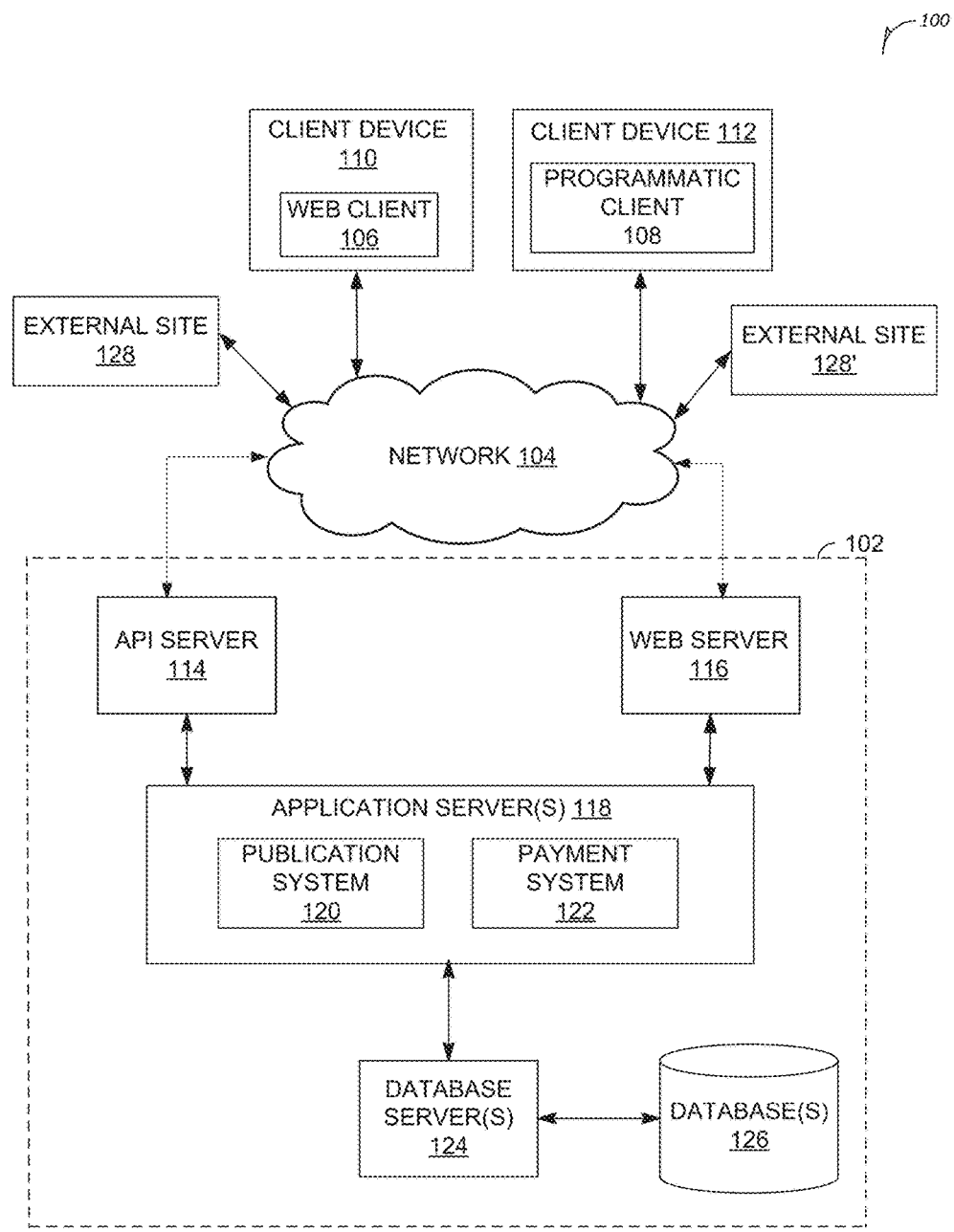
FIG. 1 is a block diagram illustrating an example embodiment of a network architecture of a system used to provide country-specific recommendations for transaction selling assistance.

With reference to FIG. 1, an example embodiment of a high-level client-server-based network architecture 100 to enable personalization of search results is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and GPS device. The client devices 110 and 112 may be a device of a user, which is used to perform a transaction involving digital goods within the networked system 102. In one embodiment, the networked system 102 is a network-based marketplace that manages digital goods, publishes publications comprising item listings of products available on the network-based marketplace, and manages payments for these marketplace transactions.

Additionally, external sites 128, 128' may be sites coupled to networked system 102 via network 104. External sites may be any desired system, including ecommerce systems.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store information to be posted (e.g., publications or listings) to the publication system 120. The databases 126 may also store digital goods information in accordance with example embodiments.

In example embodiments, the publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of an online marketplace environment. However, it is noted that the publication system 120 may be associated with a non-marketplace environment such as an informational (e.g., search engine) or social networking environment.

The payment system 122 provides a number of payment services and functions to users. The payment system 122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
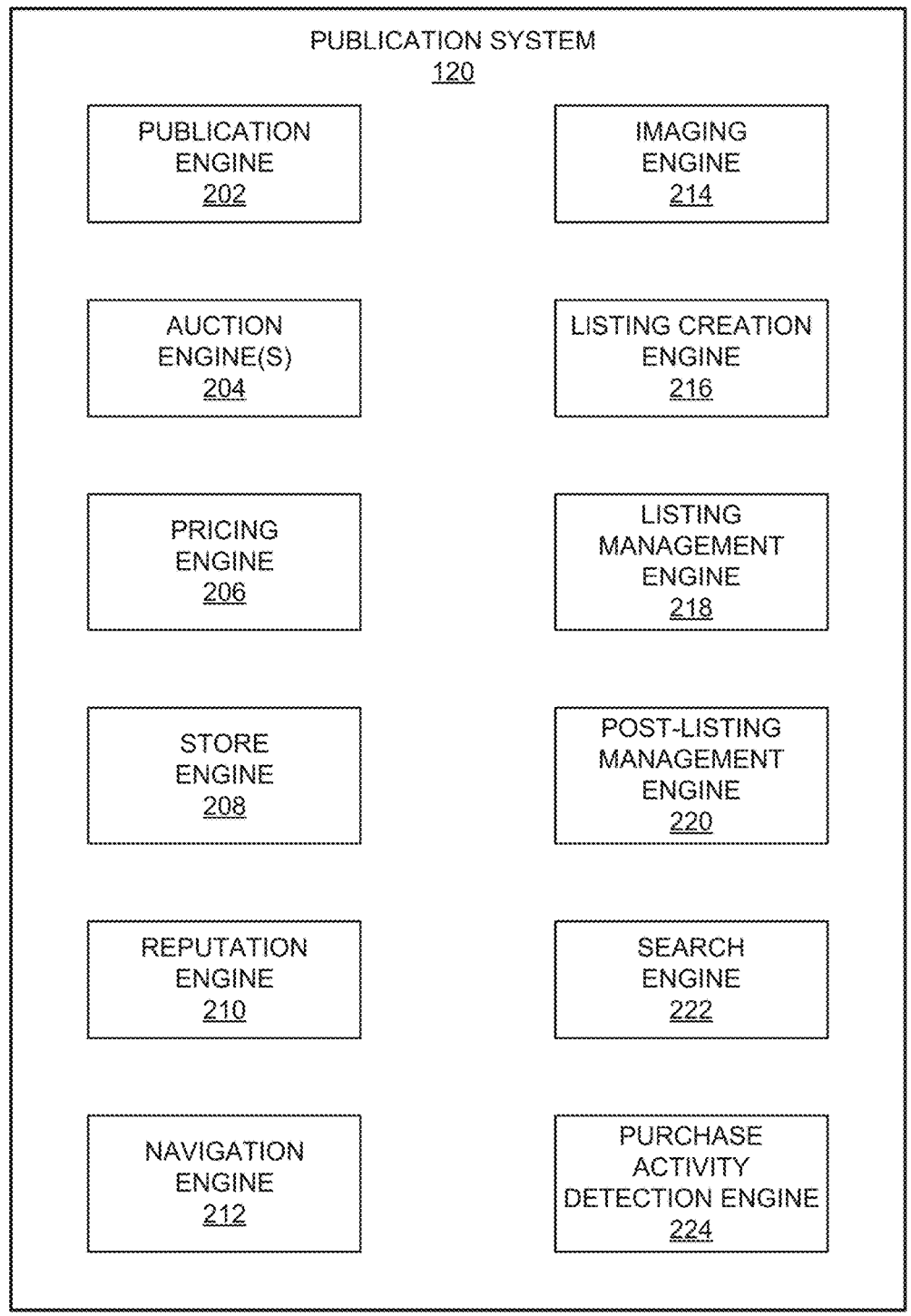
FIG. 2 is a block diagram illustrating an example embodiment of a publication system.

Referring now to FIG. 2, an example block diagram illustrating multiple components that, in one embodiment, are provided within the publication system 120 of the networked system 102 is shown. In this embodiment, the publication system 120 is a marketplace system where items (e.g., goods or services) may be offered for sale. The items may comprise digital goods (e.g., currency, license rights). The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

The publication system 120 provides a number of publishing, listing, and price-setting mechanisms whereby a buyer may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a buyer to group listings within a "virtual" store, which may be branded and otherwise personalized by and for the buyer. Such a virtual store may also offer promotions, incentives, and features that are specific and personalized to the buyer. In one example, the buyer may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, in accordance with one embodiment, users may otherwise have no history or other reference information whereby the trustworthiness and credibility of potential trading partners may be assessed. The reputation engine 210 allows a user, for example through feedback provided by one or more other transaction partners, to establish a reputation within the network-based marketplace over time. Other potential trading partners may then reference the reputation for purposes of assessing credibility and trustworthiness.

Navigation of the network-based marketplace may be facilitated by a navigation engine 212. For example, a browse module (not shown) of the navigation engine 212 allows users to browse various category, catalog, or inventory data structures according to which listings may be classified within the publication system 120. Various other navigation applications within the navigation engine 212 may be provided to supplement the browsing applications.

In order to make listings available via the networked system 102 as visually informing and attractive as possible, the publication system 120 may include an imaging engine 214 that enables users to upload images for inclusion within publications and to incorporate images within viewed listings. The imaging engine 214 may also receive image data from a user as a search query and utilize the image data to identify an item depicted or described by the image data.

A listing creation engine 216 allows users (e.g., buyers) to conveniently author listings of items. In one embodiment, the listings pertain to goods or services that a user (e.g., a buyer) wishes to transact via the publication system 120. In other embodiments, a user may create a listing that is an advertisement or other form of publication.

A listing management engine 218 allows the users to manage such listings. Specifically, where a particular user has authored or published a large number of listings, the management of such listings may present a challenge. The listing management engine 218 provides a number of features (e.g., auto-relisting, inventory level monitors, etc.) to assist the user in managing such listings.

A post-listing management engine 220 also assists users with a number of activities that typically occur post-listing. For example, upon completion of a transaction facilitated by the one or more auction engines 204, a buyer may wish to leave feedback regarding a particular buyer. To this end, the post-listing management engine 220 provides an interface to the reputation engine 210 allowing the buyer to conveniently provide feedback regarding multiple buyers to the reputation engine 210. Another post-listing action may be shipping of sold items whereby the post-listing management engine 220 may assist in printing shipping labels, estimating shipping costs, and suggesting shipping carriers.

A search engine 222 performs searches for publications in the networked system 102 that match a query. In example embodiments, the search engine 222 comprises a search module (not shown) that enables keyword searches of publications published via the publication system 120. In a further embodiment, the search engine 222 may take an image received by the imaging engine 214 as an input for conducting a search. The search engine 222 takes the query input and determines a plurality of matches from the networked system 102 (e.g., publications stored in the database 126). It is noted that the functions of the search engine 222 may be combined with the navigation engine 212.

A user activity detection engine 224 in FIG. 2 may monitor user activity during user sessions and detect a change in the level of user activity that, as discussed in more detail below, may predict that a user is about to make a purchase. The exact amount of change in the level of user activity may vary. A general guideline may be to monitor across multiple sessions and detect any significant increase over time (for example the activity level doubling or tripling in a short span).

In one embodiment, when the purchase activity detection engine detects such a condition, the ecommerce system may make an intervention to provide content for display to the user in an effort to improve the probability that the user will make a purchase, and/or also to motive the user to make the purchase on the ecommerce system site instead of moving to a competitor site in search of a better purchase. Stated another way, activity over time and at different times before a purchase action, provides an opportunity to personalize marketing to a user, based on time, by intervention as discussed above. Additional examples of including a temporal frame in that marketing personalization are discussed below.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
FIG. 3 is a diagram illustrating a shopping funnel.

FIG. 3 is a diagram illustrating a shopping funnel. The notion of a shopping funnel explaining the narrowing of a consumer's consideration set through their decision process has been widely studied in the past. The shopping funnel is based on the information processing theory which postulates that consumer decision making involves a five stage process: (1) problem recognition (2) information search (3) alternative evaluation and selection (4) outlet selection and purchase and (5) post-purchase processes. Authors B. Jansen and S. Schuster, in their paper *Bidding on the Buying Funnel for Sponsored Search and Keyword Advertising*, Journal of Electronic Commerce Research, 2011, have proposed the shopping funnel as awareness, research decision, and purchase. The list of items that consumers consider in a session or across consecutive sessions shrinks when approaching the final purchase, resembling the shape of a funnel. The sales funnel model in marketing depicts that a decreasing number of consumers remain as retailers push consumers to a final deal from the initial marketing campaign. The shopping funnel model is the parallel of a sales funnel from the point of view of consumers. This is used to describe the narrowing down of a consumer's item consideration set as s/he approaches a purchase decision.

What has been undiscovered until now, and what our analysis of session data of an ecommerce system such as eBay has shown, is that the activity levels of consumers in fact increase as they advance through stages of their purchase decision process. The discovery was made by studying a complementary behavior from earlier shopping funnel studies, namely, analyzing consumer activity levels or intensity of interaction as the purchase decision approaches. Our study also shows that it is not necessary that users narrow down their selection as strongly as has been claimed in the past. In fact users start with concentration on a large item set and slowly narrow down their attention. But that does not mean that users stop exploring for new items in that process. As users narrow down their selection of items, they are continually on the lookout for potentially new or additional items that may come on the market which could be good deals, or similar items to those under consideration. So it may be that at or near the time of purchase a user may move to a competitive ecommerce site to find a better purchase. Hence, the content discussed briefly above may not only provide temporal frame marketing personalization to motivate the user to execute a transaction such as a purchase, but to execute the transaction on this site as opposed to a competitor site.

Figure 4:
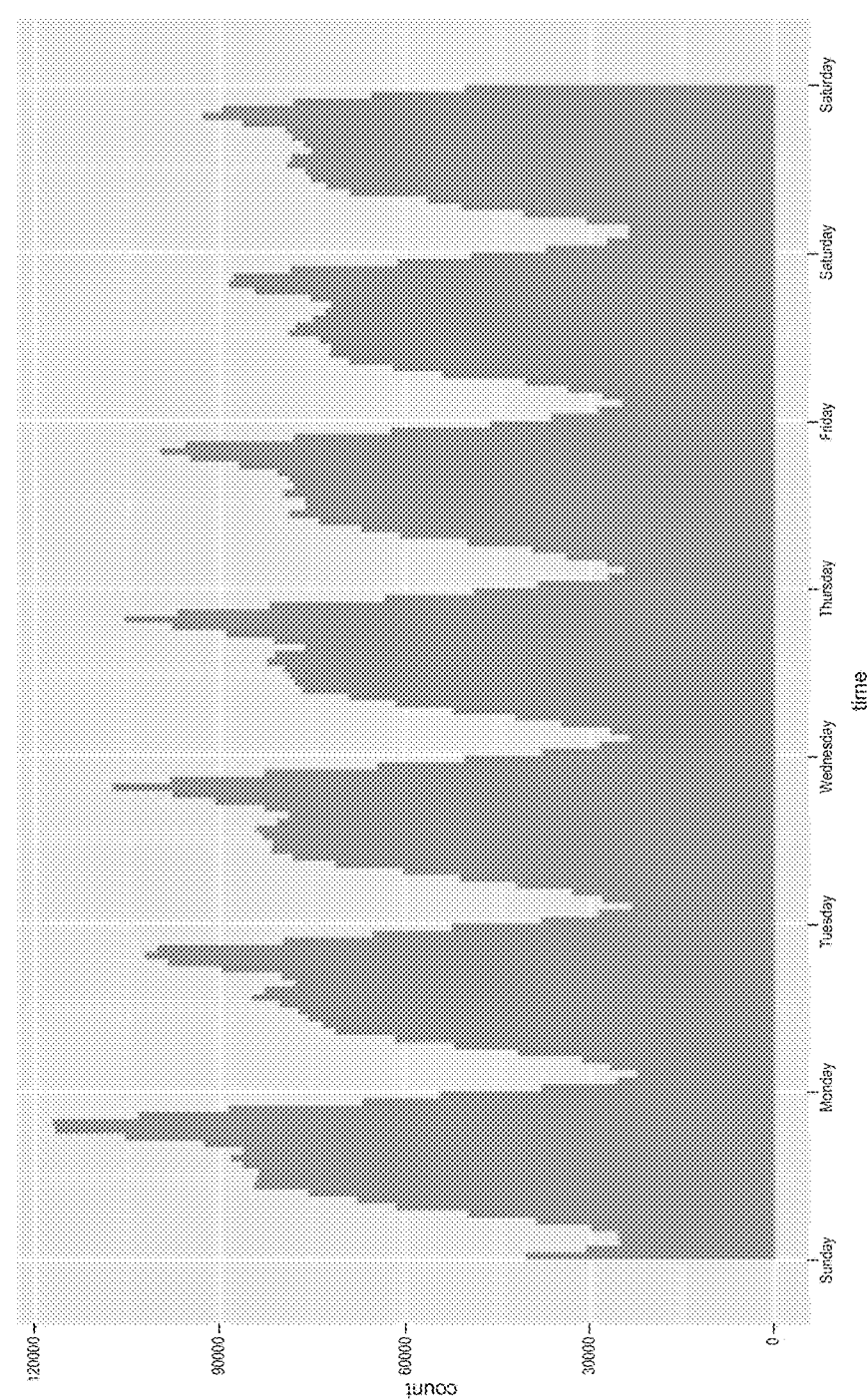
FIG. 4 is a diagram illustrating an example of user sessions over a period of time.

FIG. 4 is a diagram illustrating an example of user sessions over a period of time, as an example of how user sessions generally vary over a week. An analysis on half year session level data on a sample of ecommerce system users show that (1) users across substantially all activity levels have both long and short purchase sessions and (2) as users approach a purchase decision their activity levels (e.g. views) on a per-session or per-hour window rises sharply. This sheds light on the user decision process prior to purchase and compares with the shopping funnel model. However, the result of the analysis depicts a different picture from the shopping funnel model: through having a different rhythm in shopping, users become increasingly active right before the purchase, potentially expanding the selection of items as well as concentrating on a few items. This suggests that looking at the shopping funnel process alone is insufficient for understanding the consumer's thought process and excitement levels. One needs to dig deeper into engagement levels to obtain a better picture. In this regard, our analysis comprised sampling a significant number of data sets of users who have logged on to an ecommerce system during a given period, and retrieving essentially all their purchase related events such as, for example, "Search," "View Item," "Watch Item," "Bid" (as in an auction) "BIN" (short for Buy It Now) and "Feedback" in that period. Stated another way, user activity may be observed over several days, which may be called a session. The term "user session" and "purchaser session" may be used herein interchangeably. As an example, a user may log into an ecommerce system, spend some time viewing various items, then log off and then perhaps log back in the same evening or the next day and continue exploring items. Each of these pieces may be called a session. There is what is termed cross session rhythm, meaning how a user's activity level in one session is changing, with respect to the previous session or the next session. This may be determined by observing several consecutive sessions and detecting where the activity level changes from one session to the next, and to the next, and so on. This introduces a temporal frame in the context of comparing sessions of users online.

Each session may include at least one item search/browse that is in the same category of the final purchased item. Intuitively bidding activities exhibit very different dynamics from traditional online shopping (for e.g. excessive bidding as the auction nears the close time). Therefore we may exclude the sessions with bid and focus on purchase sessions.

Figure 5:
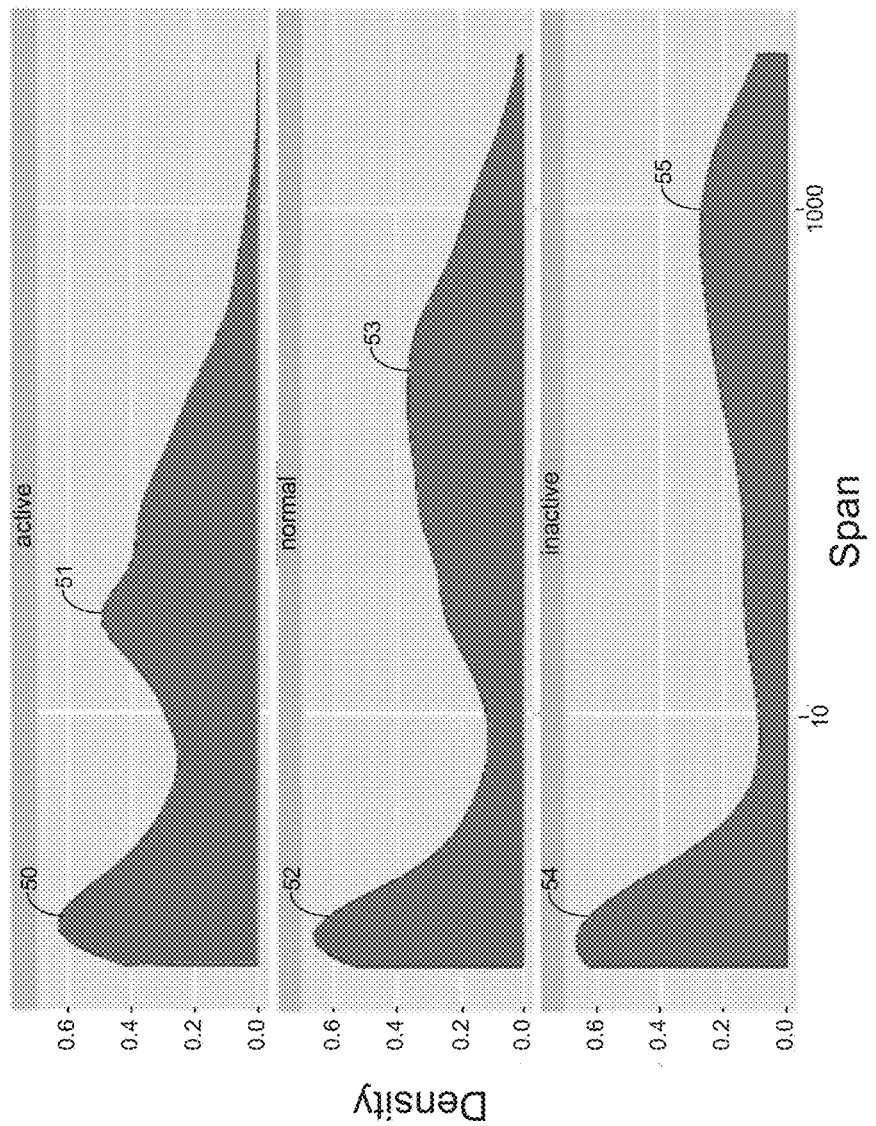
FIG. 5 is a diagram illustrating shopping spans across different types of users.

Results of our analyses such as those discussed above can be organized for two dimensions: (1) the span of purchase session and (2) the pre-purchase modeling of activity levels. The span of shopping can be designated as fast shopping versus slow shopping. FIG. 5 is a diagram illustrating shopping spans across different types of users. In one embodiment, FIG. 5 shows shoppers who have made several transactions (or fast shoppers) labeled "Active" in FIG. 5, shoppers who have made very few transactions labeled "Inactive," slow shoppers, and "normal" shoppers, classified as those that fall in between. The bimodal distribution in FIG. 5 indicates that while consumer exploration durations span an entire range there are two peaks; a larger one 50, 52, 54 indicating transactions that resulted from shorter exploration phases while another smaller peak 51, 53, 55 indicates transactions that involved significantly longer exploration durations as shown by the horizontal time axis. The horizontal access is presented on a logarithmic-scale for number of hours from the beginning of the exploration phase until a transaction is made.

Figure 6A:
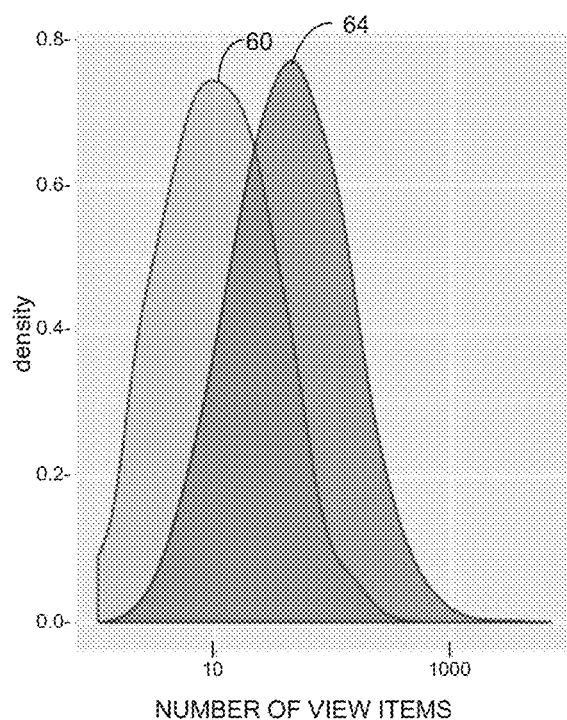
FIG. 6A and FIG. 6B are diagrams illustrating view and search span distributions prior to purchases made by a user.
Figure 6B:
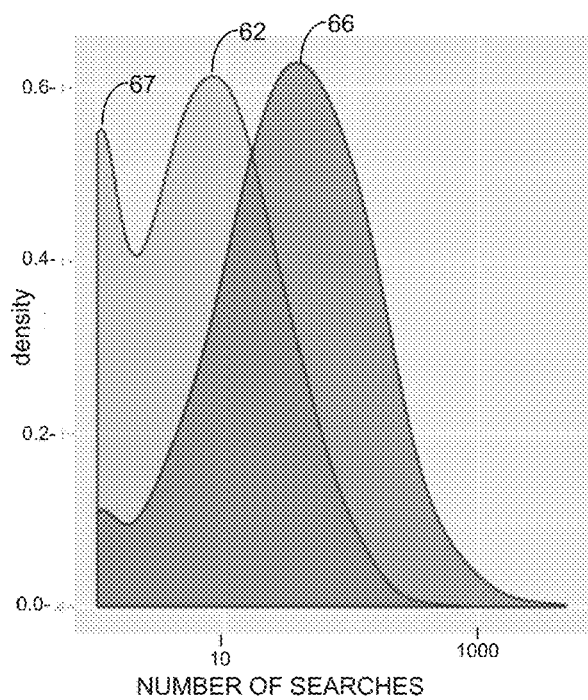

As to span of purchase, FIGS. 6A and 6B illustrate results of the data set analysis discussed above, and illustrate that shopping spans across different types of users the fast (or quick) shoppers do less research (or view and search fewer items) before purchase. Here the horizontal axes show the number of items viewed before a purchase is made or the number of searches issued. An immediate hypothesis might have been that the more active users tend to spend more time before the purchase. However, the comparison of users in different activity levels (classified, in one example investigation, by total number of sessions in half a year) shows that the divergent shopping pattern persists among all three levels of FIG. 5. Knowing that some users spend more time and some spend less time for purchases, then pre-purchase behavior as users advance through stages of the shopping funnel model may be investigated. In one embodiment, view and search span distributions prior to purchases were investigated in the above analysis. Purchase sessions that span less than eight hours were categorized as fast and otherwise were categorized as slow. FIG. 6A illustrates results for view span distributions prior to purchases and FIG. 6B illustrates results for search distributions prior to purchases. The early mode 67 seen in the figure illustrates that certain transactions still occur with minimal exploration.

Figure 7:
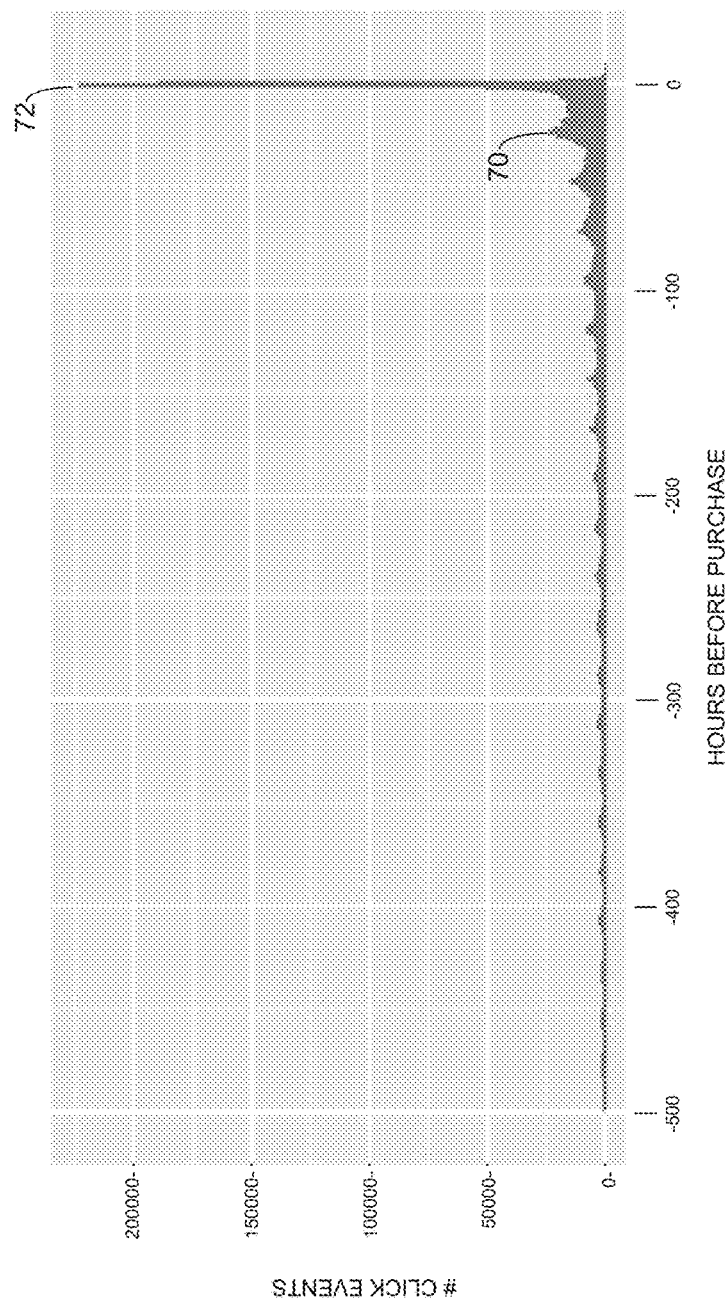
FIG. 7 is a diagram illustrating distribution of user actions/events before purchase.

Activities of users before the purchase for understanding user behavior on an ecommerce system may then be analyzed. FIG. 7 shows action intensity prior to purchase decisions for all the users measured as number of click events. As can be seen at 70, 72, the total activity very quickly ramps up close to a decision. Note that most events happen 12 hours before the purchase and there is significant increase of activities getting closer to the final purchase. An understandable pattern is the periodical peaks separated by roughly 24 hours corresponding to the daily cycles.

Figure 8:
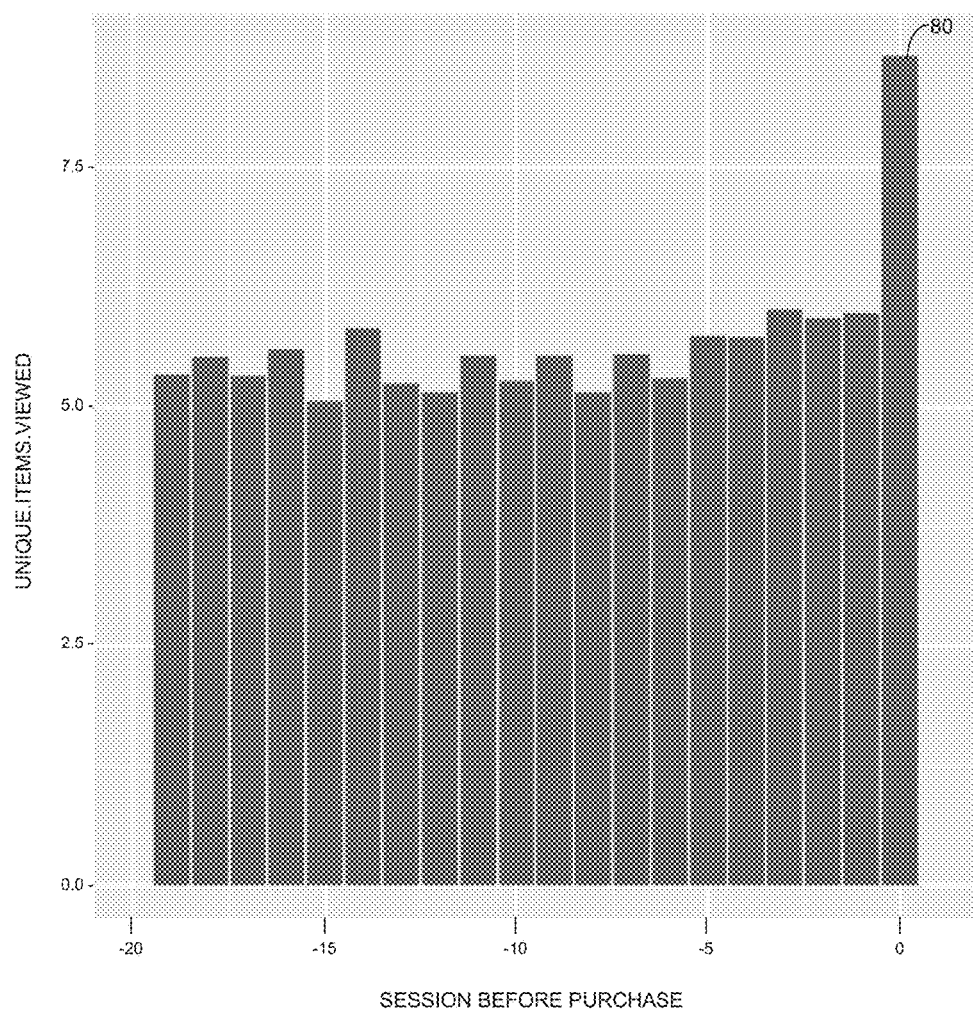
FIG. 8 is a diagram illustrating the number of unique items viewed by a user prior to making a purchase.
Figure 9:
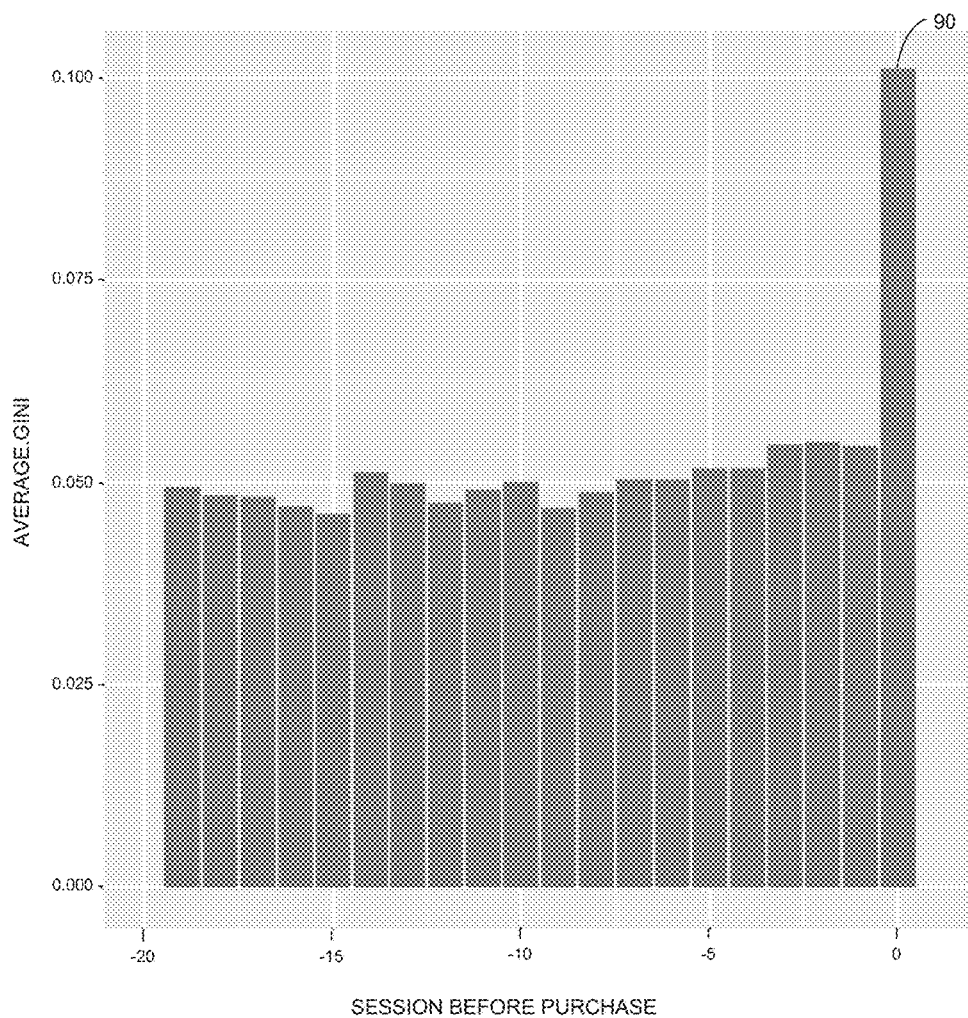
FIG. 9 is a diagram illustrating the Gini index of views prior to making a purchase.

To better model the research and decision stages of users the pool of items considered and the concentration of attention on a few items may be visualized as in FIG. 8 and in FIG. 9. These figures show that users expand their item selection scope, or items viewed, just before the purchase, as at 80 in FIG. 8. Hence the increasing number of unique items viewed before purchase is represented in FIG. 8. At the same time users concentrate more views (or attention) on a few items as at 90 in FIG. 9 resulting in the increase of Gini index 1 towards the purchase, where the Gini index measures the disparity of views on items. In particular in the same session as the final purchase, i.e. session 0 in FIGS. 8 and 9, users research more items and simultaneously narrow down to the final candidates.

The above pattern suggests a novel view that does not fit the shopping funnel model. The shopping funnel suggests users narrow down their selections before the purchase. There are two possible explanations. The first is that online shopping compresses the shopping process so that decision stage closely follows research (in the same session) or even in parallel. The other is that users do research on other sites than the online shopping site itself e.g. users may ask on related forums or get advice from friends on social network sites. As further exploration remains open this study highlights a fundamentally new behavioral pattern in last-minute exploration and substantially increased activity levels yielding behavioral insights that go beyond what can be explained by traditional shopping funnel models.

The purchase activity detection engine 224 of FIG. 2 may detect increased activity of the type discussed above, and may then transmit to the user content that is intended to change the user experience in a way that increases the probability of purchase, and in some instances, increases the probability of purchase on the ecommerce system's site. This may be implemented in an effort to address and forestall the probability that as the user narrows down to a purchase, the user may move to a competitor ecommerce site to make a purchase of a similar item that the user may perceive as a better buy under the circumstances.

The user content that may be transmitted could include:
1. Altering the ecommerce system's merchandizing algorithm to narrow down at later stages of the funnel or to limit items merchandized to specific details, for example, to someone looking at something used and limiting shown items to similar price ranges, or only to mint condition items.
2. Item suggestions could add timely labels, for example, "looks like you are really interested in this item—here are the items like this that we think are the best value". Or the ecommerce system may suggest that the shown items are based on the best match to the user's activity as detected by the purchase activity detection engine.
3. User experience to increase focus by showing fewer items along the lines of "you may also want to buy . . . " and modify "similar items . . . "
4. Presenting the right ads/coupons/incentives at the right time (so that someone who is on the verge of making a decision is motivated to transact on the platform).
5. Potentially show items and labels based on popularity on the ecommerce system or beyond, or widget text like "you don't seem to be sure about this, how can I help".

The above may be implemented by, in one embodiment, the following algorithm:
1. Look at user cross-session activity patterns to predict likelihood of transaction.
2. Let user activity (say items viewed) in current session be S_{now}, and previous sessions be S_{now-1}, S_{now-2} and so on.
3. Therefore the raw activity counts are denoted by |S_{now}|, |S_{now-1}|, . . . .
4. Let us use t to denote time steps (in session units)—the below measure the "gradient" or "trend", I.e. temporal activity level change, over last few sessions.
5. If for all t=0, 1, 2, we have |S_(now-t|/|S_({now-t-1}|>\gamma, then predict that transaction "very likely" in current session.

Step 5 above presents merely one possible algorithm, but there could be several such possibilities. For example, in step 5, if \gamma=2, then the condition measures whether the activity is at least doubling in every subsequent session for the last 4 sessions. And if yes, then we predict that a transaction is very likely in current session. Here of course the number of time steps considered, the value of gamma, and even the measure (in this case ratio) are all parameters/choices that can be modified. For example, more generally one might consider any form of exponential increase in activity across consecutive session. One may also allow some tolerance to this rule, for user behavior variance, for e.g., it may be sufficient if for alpha fraction of previous T time steps, I.e. t=0, 1, 2, . . . T, we have |S_{now-t}|/|S_{now-t−1}|>\gamma. Potentially even \gamma could be a function of t.

Figure 10:
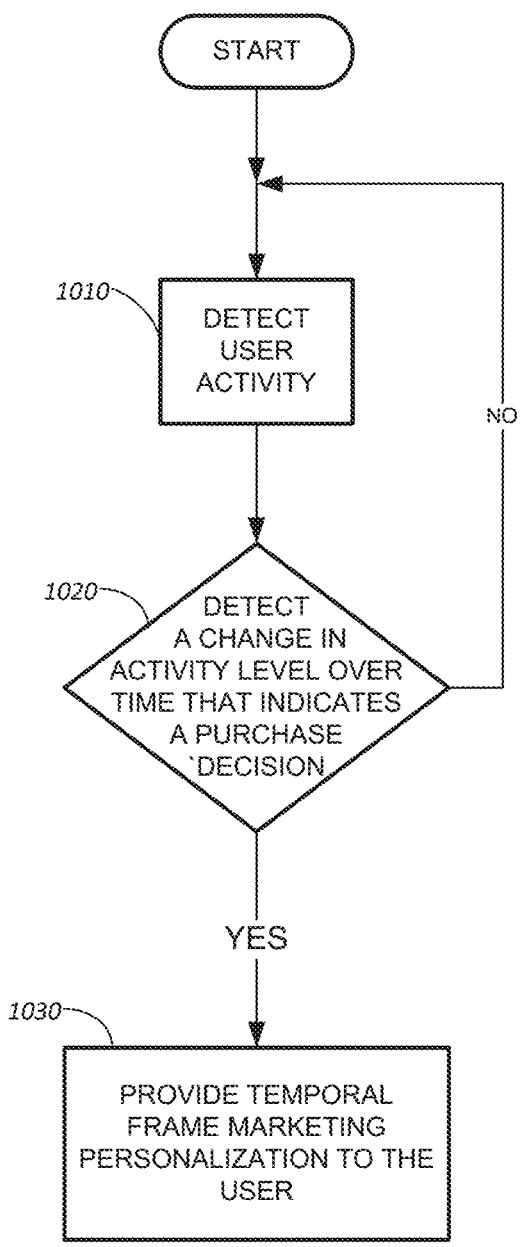
FIG. 10 is a flow chart illustrating a method according to an embodiment.

FIG. 10 is a flow chart illustrating a method according to an embodiment. At 1010 the system may detect user activity as discussed above with respect to the purchaser activity detection engine 224. At 1020, the system tests to detect a change in activity level, for example click events such as described below, over time that indicates a purchase decision is about to be made such as discussed above also with respect to purchaser activity detection engine 224. If no such change in activity level is detected, the system returns to 1010 and continues. If such a change in activity is detected, then at 1030 the system provides temporal frame marketing personalization to the user, such as the content that is discussed above.

Figure 11:
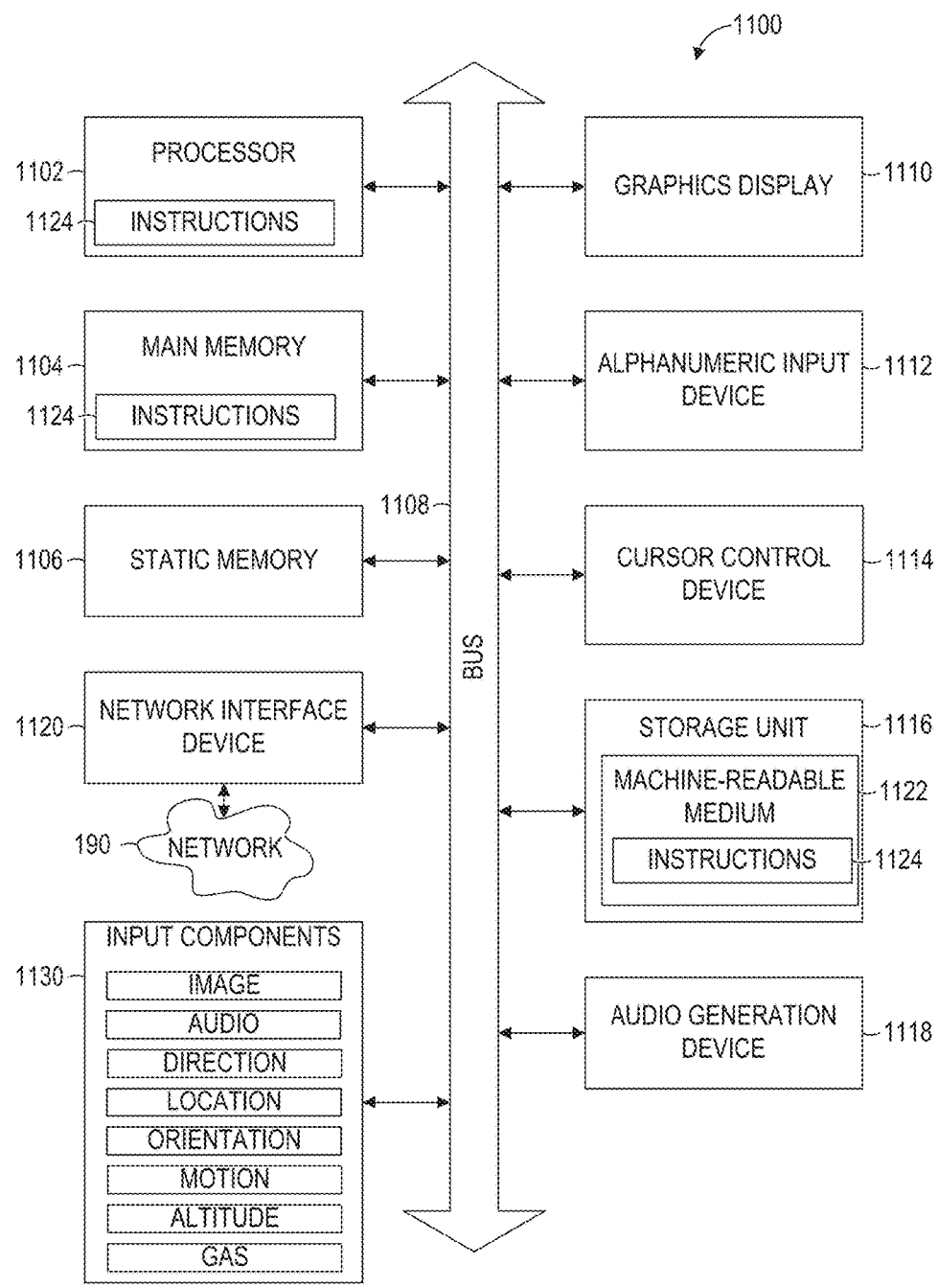
FIG. 11 is a simplified block diagram of a machine in an example form of a computing system within which a set of instructions for causing the machine to perform any one or more of the methodologies discussed herein may be executed.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
   receiving, by at least one computer processor, electrical signals from a device of a user via an electronic communication channel to aggregate a count of electrical signals received per unit time, the electrical signals generated by the device in response to user input across a plurality of user sessions of the user, including a current user session, to indicate a number of clicks made by the user on a user interface of a publication system per the unit time;
   detecting, by the at least one computer processor, an increase in the count of electrical signals per the unit time generated by the device of the user, such that the count of electrical signals is at least proportionate to intensity of clicking activity during the current user session, the detecting comprising:
     analyzing whether the count of electrical signals has increased across the plurality of user sessions, the analyzing comprising:
       observing user activity patterns across the plurality of user sessions to define cross-session activity patterns to assist in prediction of the likelihood of a final purchase decision during the current user session;
       denoting one or more discrete time increments within the plurality of user sessions;
     measuring a temporal clicking activity level change relative to the discrete time increments during the current user session; and
     determining whether the measured temporal clicking activity level change exceeds a pre-defined threshold limit to predict that the final purchase decision is likely to occur during the current user session;
   communicating to the device, over the electronic communication channel, personalized marketing content data for display through the user interface in response to an indication that the final purchase decision is likely to occur during the current user session, the personalized marketing content data relating to motivating the user to execute the transaction.

2. The method of claim 1 wherein the publication system is an ecommerce system.

3. The method of claim 2 wherein the clicks on the user interface made by the user represent one of searching, viewing an item, requesting that an item be watched for, bidding on an item, indicating a decision to buy the item now, or providing feedback.

4. The method of claim 2 wherein the personalized marketing content data comprises content relating to motivating the user to execute the transaction on the ecommerce system.

5. The method of claim 1 wherein detecting the increase in the count of electrical signals per unit time comprises detecting an increase of the Gini index for the activity of the user, the Gini index being based on the count of electrical signals per unit time.

6. Computer-readable hardware storage having embedded therein a set of instructions which, when executed by one or more processors of a computer, causes the computer to execute operations comprising:
   receiving electrical signals from a device of a user via an electronic communication channel to aggregate a count of electrical signals received per unit time, the electrical signals generated by the device in response to user input across a plurality of user sessions of the user to indicate a number of clicks made by the user on a user interface of a publication system per the unit time to define a current user session;
   detecting an increase in the count of electrical signals per unit time generated by the device of the user, the detecting comprising:
     analyzing whether the count of electrical signals has increased across the plurality of user sessions, the analyzing comprising:
       observing user activity patterns across the plurality of user sessions to define a cross-session rhythm, the cross-session rhythm relating to change in user activity level across the plurality of user sessions;
       denoting one or more discrete time increments associated with the cross-session rhythm; and
       determining whether the change in user activity level, relative to the one or more discrete time increments, exceeds a pre-defined threshold limit to predict that a final purchase decision is likely to occur in the current user session; and
   making an intervention with the device, over the electronic communication channel, to provide personalized marketing content data for display through the user interface in response to an indication that the final purchase decision is likely to occur during the current user session, the personalized marketing content data relating to motivating the user to execute the transaction.

7. Computer-readable hardware storage of claim 6 wherein the publication system is an ecommerce system.

8. Computer-readable hardware storage of claim 7 wherein the clicks on the user interface made by the user represent one of searching, viewing an item, requesting that an item be watched for, bidding on an item, indicating a decision to buy the item now, or providing feedback.

9. Computer-readable hardware storage of claim 7 wherein the personalized marketing content data comprises content relating to motivating the user to execute the transaction on the ecommerce system.

10. Computer-readable hardware storage of claim 7 wherein the increase in the count of electrical signals per unit time comprises detecting an increase of the Gini index for the activity of the user, the Gini index being based on the count of electrical signals per unit time.

11. A system comprising:
one or more computer processors configured to:
receive electrical signals from a device of a user via an electronic communication channel to aggregate a count of electrical signals received per unit time, the electrical signals generated by the device in response to user input across a plurality of user sessions of the user to indicate a number of clicks made by the user on a user interface of a publication system per the unit time to define a current user session prior to a final purchase decision, the number of clicks positively correlating to a first action intensity of the user;
detect an increase in the count of electrical signals per unit time generated by the device of the user, the detection comprising:
analyzing whether the count of electrical signals has increased across the plurality of user sessions, the plurality of user sessions including the current user session and at least one prior user session, the analyzing comprising:
observing the first action intensity across the current user session and the at least one prior user session, the at least one prior user session having a second action intensity that is different from the first action intensity;
denoting one or more discrete time increments within the current user session and the at least one prior user session; and
determining whether a ratio of the first action intensity to the second action intensity, relative to the discrete time increments, is greater than a pre-defined value to predict that the final purchase decision is likely to occur; and
communicate to the device, over the electronic communication channel, personalized marketing content data for display through the user interface, the personalized marketing content data relating to motivating the user to execute the transaction.

12. The system of claim 11 wherein the publication system is an ecommerce system.

13. The system of claim 12 wherein the clicks on the user interface made by the user represent one of searching, viewing an item, requesting that an item be watched for, bidding on an item, indicating a decision to buy the item now, or providing feedback.

14. The system of claim 12 wherein the personalized marketing content data comprises content relating to motivating the user to execute the transaction on the ecommerce system.

* * * * *